(12) United States Patent
Park et al.

(10) Patent No.: US 8,121,476 B2
(45) Date of Patent: Feb. 21, 2012

(54) ALL-OPTICAL CSMA/CD APPARATUS IN BASE A ETHERNET AND THE METHOD THEREFOR

(75) Inventors: Chang Soo Park, Daejeon (KR); Soo Wook Han, Gwangju (KR); Tae Young Kim, Seoul (KR); Hyun Ho Yun, Gwangju (KR)

(73) Assignee: Gwangju Institute of Science and Technology, Gwangu (KR)

( * ) Notice: Subject to any disclaimer, the term of this patent is extended or adjusted under 35 U.S.C. 154(b) by 901 days.

(21) Appl. No.: 11/916,881

(22) PCT Filed: Jun. 9, 2006

(86) PCT No.: PCT/KR2006/002209
§ 371 (c)(1),
(2), (4) Date: Jul. 3, 2008

(87) PCT Pub. No.: WO2006/132510
PCT Pub. Date: Dec. 14, 2006

(65) Prior Publication Data
US 2009/0123148 A1    May 14, 2009

(30) Foreign Application Priority Data

Jun. 10, 2005  (KR) ................ 10-2005-0050049

(51) Int. Cl.
*H04B 10/08* (2006.01)
*H04B 10/00* (2006.01)
(52) U.S. Cl. .............. 398/17; 398/22; 398/23; 398/24
(58) Field of Classification Search .............. 398/17–24
See application file for complete search history.

(56) References Cited

U.S. PATENT DOCUMENTS

| 6,014,235 | A | 1/2000 | Norte | |
| 6,684,031 | B1 * | 1/2004 | Kogelnik et al. | 398/99 |
| 6,870,836 | B1 * | 3/2005 | Dyke et al. | 370/355 |
| 2003/0058527 | A1 | 3/2003 | Kim et al. | |
| 2004/0196534 | A1 | 10/2004 | Obeda et al. | |
| 2006/0275038 | A1 * | 12/2006 | Walton et al. | 398/71 |

FOREIGN PATENT DOCUMENTS

| WO | WO 03/081811 A1 | 10/2003 |
| WO | WO 2004/068764 A1 | 8/2004 |

* cited by examiner

*Primary Examiner* — Kenneth N Vanderpuye
*Assistant Examiner* — Daniel Dobson

(57) ABSTRACT

An all-optical carrier sense multiple access collision detection apparatus and method for checking by using mutual gain saturation whether distortion occurs in two or more optical signals due to mutual interference when the optical signals pass through a semiconductor optical amplifier.

10 Claims, 7 Drawing Sheets

[Fig. 1]
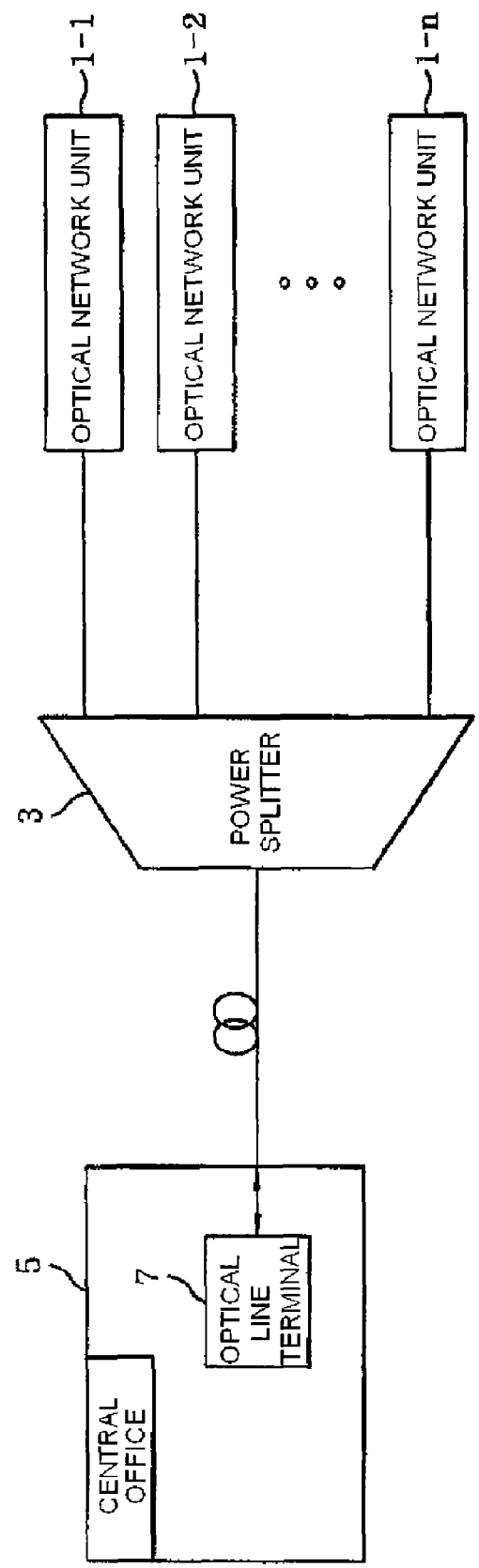

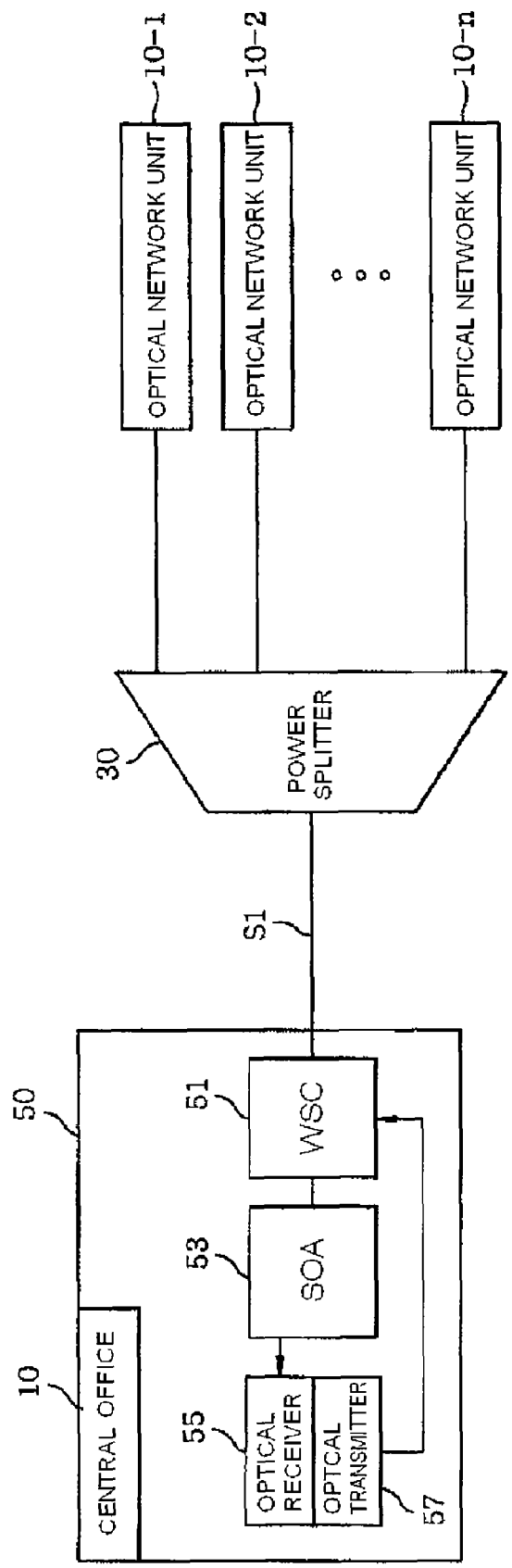
[Fig. 2]

[Fig. 3]
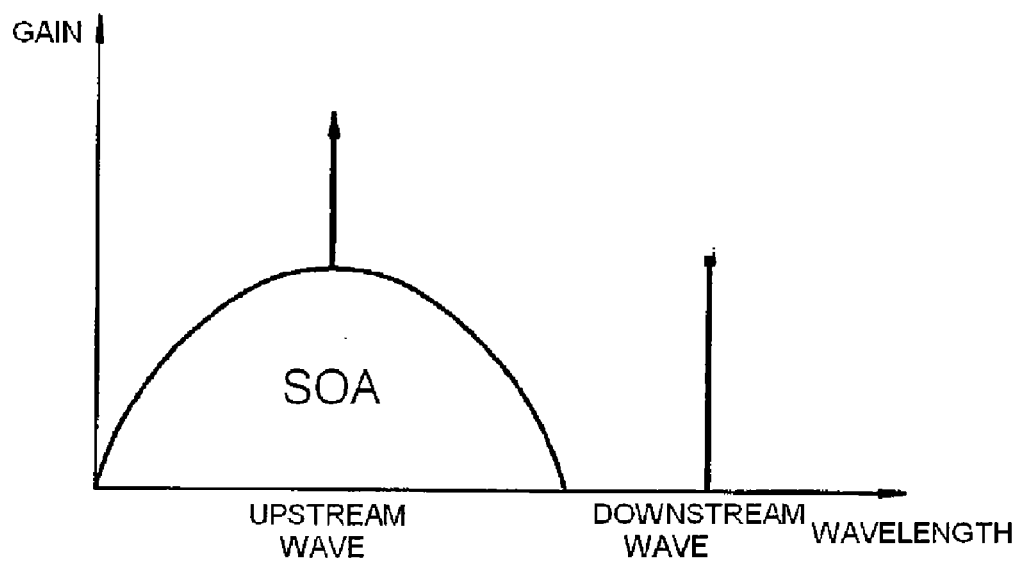
[Fig. 4]
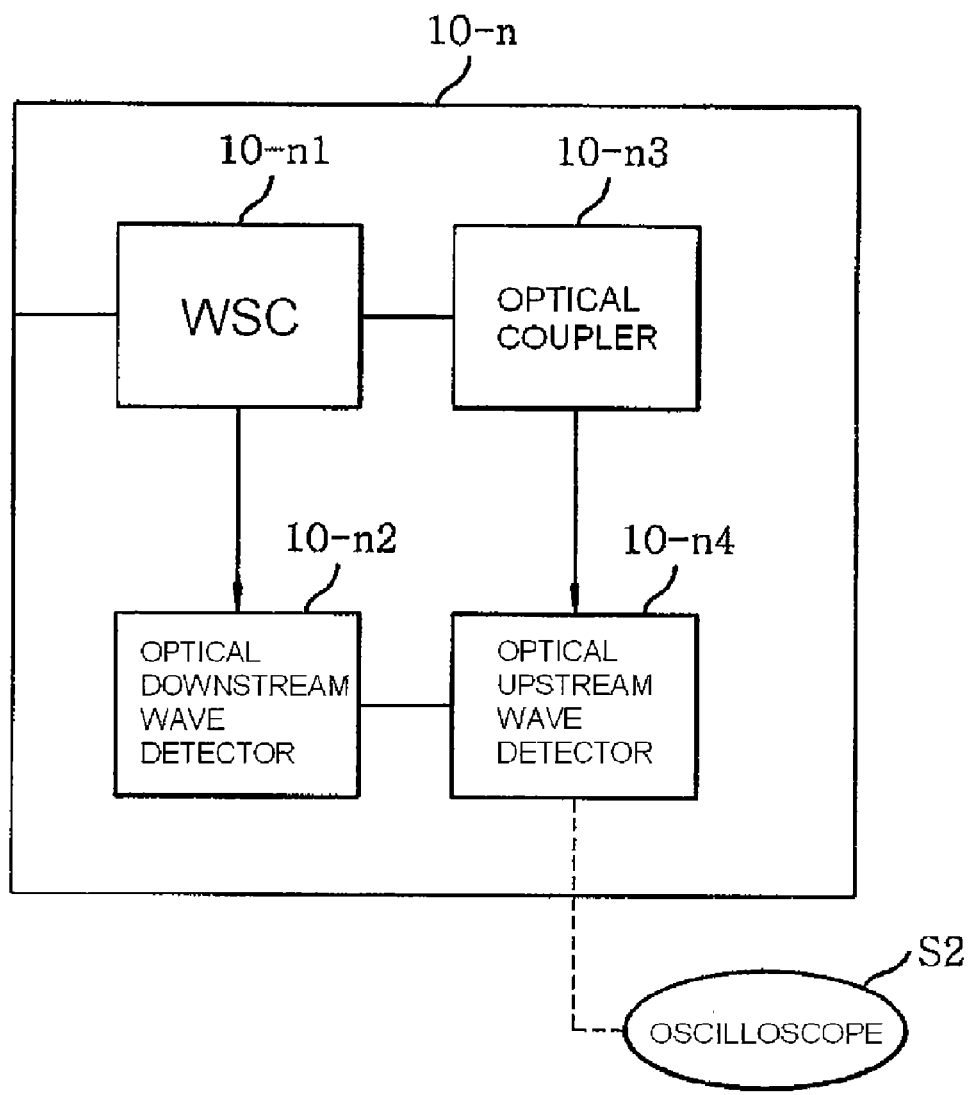

[Fig. 5]
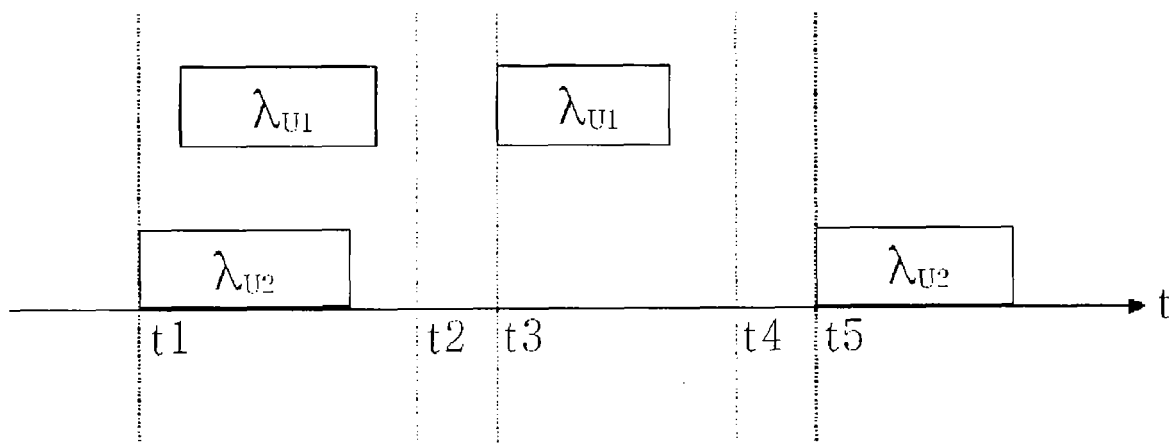

[Fig. 6]
(a)
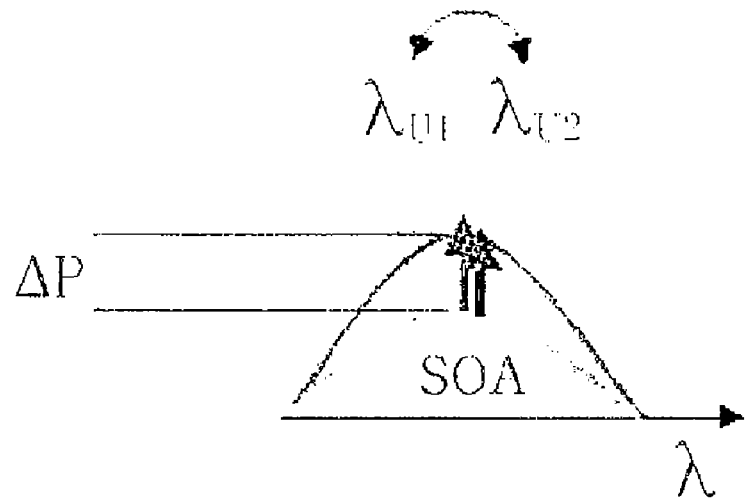
(b)
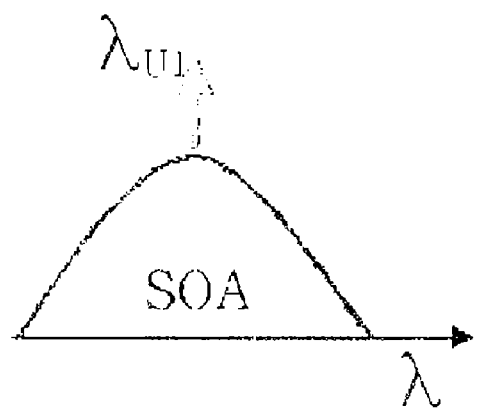
(c)
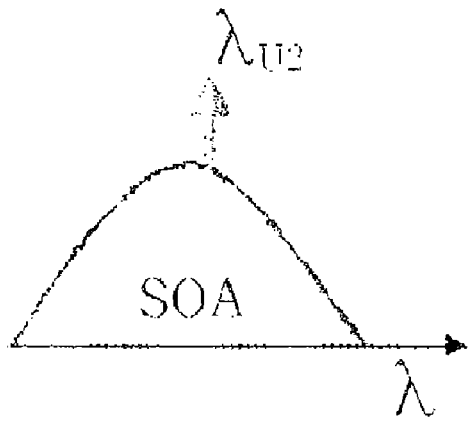

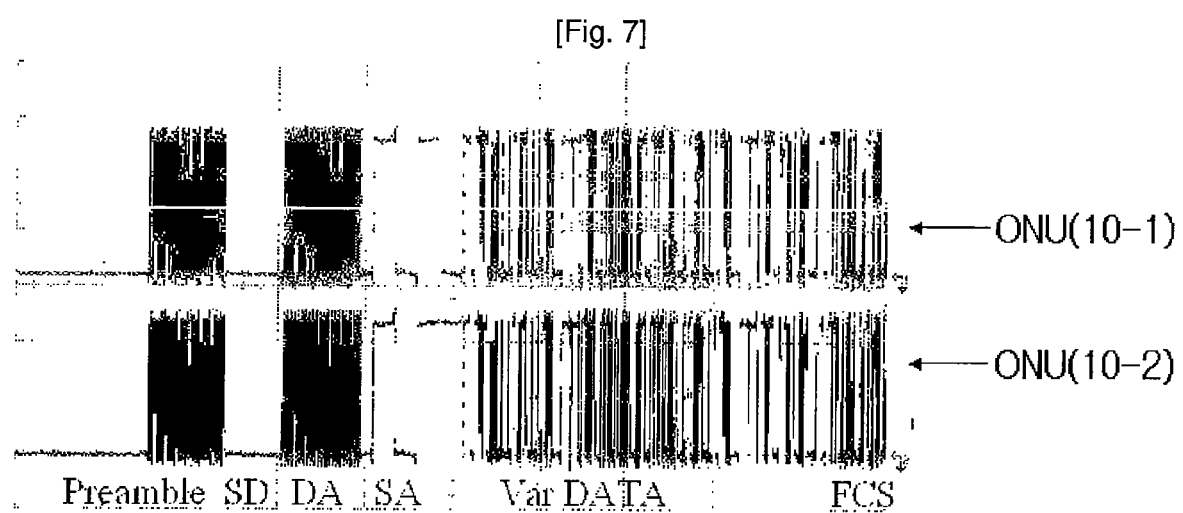
[Fig. 7]

[Fig. 8]
(a)
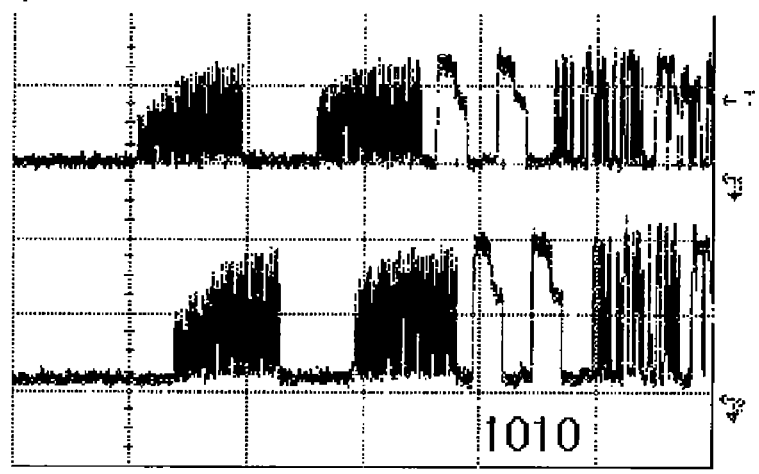
(b)
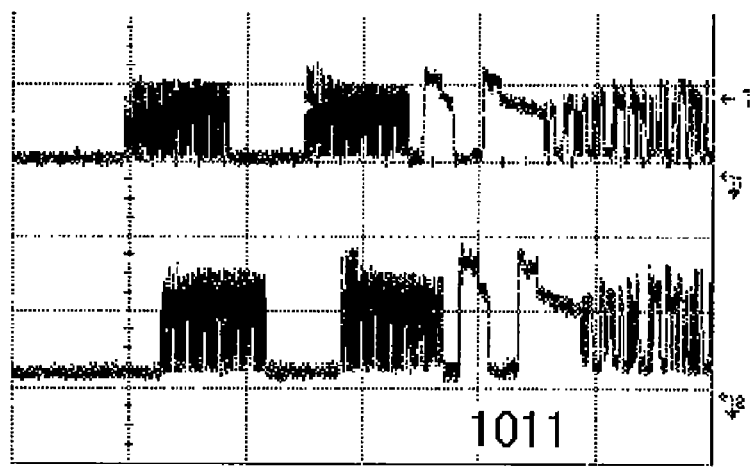
(c)
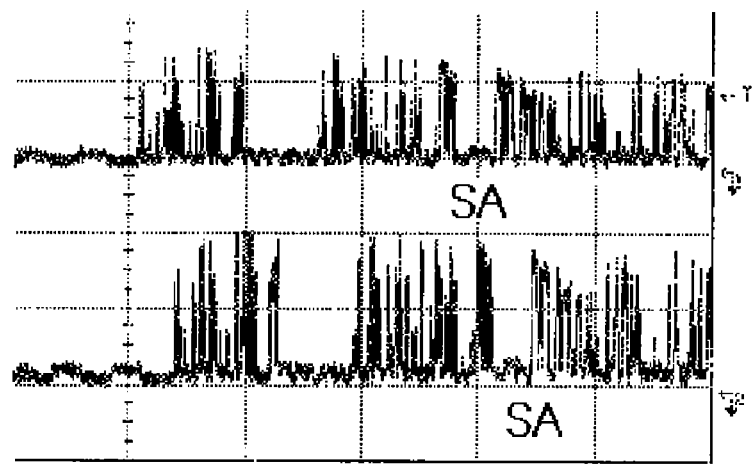

US 8,121,476 B2

ALL-OPTICAL CSMA/CD APPARATUS IN BASE A ETHERNET AND THE METHOD THEREFOR

TECHNICAL FIELD

The invention relates to an All-optical CSMA/CD apparatus in base a ethernet and the method therefore, and more particularly, to an apparatus and method capable of checking by using mutual gain saturation whether distortion occurs in two or more optical signals due to mutual interference when the optical signals pass through a semi-conductor optical amplifier (SOA) at the same time, amplifying the optical signals transmitted in the upward direction when no distortion occurs in the optical signals, and monitoring the occupation of a plurality of subscribers with respect to a common network when the plurality of subscribers want to use an optical Ethernet network.

BACKGROUND ART

As known in the related art, in an Ethernet-based network, a semiconductor optical amplifier (SOA) of a central office (CO) is an amplifier having a bidirectional amplifying characteristic, in which holes and electrons are rapidly recombined When different modulating signals are input to the SOA at the same time, the SOA has non-linear mutual gain saturation, which causes distortion to occur between optical signals. That is, when two or more different optical signals are input to the SOA and are then amplified in a saturated region, crosstalk occurs in the gain between the optical signals and the phases of the optical signals, which causes mutual gain saturation.

At that time, signal components of two optical signals are distorted by the mutual gain saturation in the SOA, and thus the two optical signals do not include the original information any longer. That is, the distorted optical signals reach an upstream-side optical line terminal (OLT) of the CO by the bidirectional amplifying characteristic of the SOA and are read as error signals caused by the distortion between different subscriber signals. In addition, the optical signals transmitted in the downstream direction by the SOA allow an inexpensive optical detector, such as an optical network unit (ONU), to check distortion occurring in a common line.

FIG. 1 is a block diagram illustrating a general optical network. As shown in FIG. 1, a downstream optical signal transmitted from an OLT 7 of a CO 5 is divided by a power splitter (PS) 3 position in a remote site, and the divided optical signals reach a plurality of optical network units (ONUs) 1-1, 1-2, ..., 1-n that are positioned on the downstream side. The optical signal from the individual ONU is transmitted to OLT through a common network by using a remote node (RN) positioned in a remote site. At that time, a plurality of subscribers cannot use the common network at the same time, and thus a technique for controlling it, such as a carrier sense multiple access/collision detection (CSMA/CD) technique, is required. Therefore, the CSMA/CD technique enables a plurality of subscribers who want to transmit signal in the downstream direction to provide an upstream service to the CO 5.

More specifically, as shown in FIG. 1, in an optical network, the OLT 7 of the CO 5 is composed of a transmitting terminal for transmitting a downstream optical signal and a receiving terminal for receiving an upstream signal, and the downstream signals are simultaneously transmitted to the plurality of ONUs 1-1, 1-2, ..., 1-n through the PS 3 of the remote node over the common network. In addition, upstream signals generated by the plurality of ONUs 1-1, 1-2, ..., 1-n are combined by the PS 3 and are then transmitted to the OLT 7 of the CO 5 over the common network. If the distance from the OLT 7 to the plurality of ONUs 1-1, 1-2, ..., 1-n is large, an optical amplifier (OA) may be provided in the front state of the receiving terminal of the OLT 7 in order to compensate for loss due to the long distance. In this case, a Fabry-Perot laser or a distributed feedback laser may be used as a light source for each of the plurality of ONUs 1-1, 1-2, ..., 1-n. Preferably, an inexpensive light source, such as the Fabry-Perot laser, is used to reduce the cost of the optical network.

In the above-mentioned configuration, when a plurality of subscribers transmit optical signals at the same time and distortion occurs in the transmitted optical signals, CSMA/CD can be used to control the distortion occurring in the optical signals. CSMA/CD is performed by an electric switching method using media access control (MAC). In order to apply the method to an optical network, optical signals are converted into electric signals and are then analyzed in network layer No. 2, and it is checked whether distortion occurs in the common network due to a plurality of subscribers. However, an additional circuit is needed to check whether the distortion occurs, and the check is performed in an electric area, resulting in a time delay. Therefore, the method is not suitable for a high-speed optical Ethernet environment in which a large amount of data is transmitted at high speed.

In order to solve the above-mentioned problem, a technique for enabling a PS positioned in a remote site to monitor the usage state of all optical network units with respect to a common network through a loop-back in an optical method has been proposed. However, the technique is excellent in transmission efficiency, but cannot solve the above-mentioned problem when distances between the PS 3 and subscribers are different from each other or when optical outputs from the ONUs are different from each other. In addition, collision is detected on the basis of the intensity of an optical return signal. Therefore, in order to detect the collision, the output optical powers of all the subscribers should be equal to each other at the input terminal of the PS 3. However, when input optical power varies due to a change in an optical path, an error in detecting distortion occurs.

As another method, subscribers use different wavelengths to physically prevent the distortion of optical signals. However, in this case, service providers need to have additional lasers for an optical network having different wavelengths, and an arrayed waveguide grating router (AWGR) should be necessarily used instead of the power splitter. AWGR is suitable for a wavelength-division-type optical network, but is not suitable for a passive optical network (PON) using a single upstream wavelength. The above-mentioned methods enable a plurality of optical network units to use a common network in realizing an optical network, but do not consider the monitoring of the common network and the monitoring of distortion by the central office.

DISCLOSURE OF INVENTION

Technical Problem

The present invention has been made in view of the above-mentioned problems, and an object of the invention is to provide an All-optical CSMA/CD apparatus in base a ethernet and the method capable of checking by using the mutual gain saturation of a semiconductor optical amplifier (SOA) of a central office whether distortion occurs in two or more optical signals due to mutual interference when the optical signals pass through the semiconductor optical amplifier at the same time, amplifying the optical signals transmitted in the upward direction when no distortion occurs in the optical signals, and monitoring the occupation of a plurality of subscribers with respect to a common network when the plurality of subscribers want to use an optical Ethernet network.

Technical Solution

According to an aspect of the invention, an Ethernet-based all-optical carrier sense multiple access/collision detection apparatus includes: a plurality of optical network units (ONUs) that carry different optical signals on upstream waves $\lambda_U$ and transmit the upstream waves $\lambda_U$; a power splitter (PS) that multiplexes the optical signals and transmits the multiplexed optical signals; and a central office (CO) that checks whether the multiplexed optical signals are distorted, amplifies some of the checked optical signals, returns the other optical signals, and monitors the occupation of the plurality of optical network units with respect to a common network.

According to another aspect of the invention, an Ethernet-based all-optical carrier sense multiple access/collision detection method includes: a first step of carrying different optical signals on an upstream wave $\lambda_U$ and transmitting the upstream wave $\lambda_U$; a second step of multiplexing the optical signals, selecting the multiplexed optical signals according to the wavelengths thereof, combining the selected optical signals, and transmitting the combined optical signals; and a third step of checking whether the combined optical signals are distorted due to mutual interference by using a mutual gain saturation, amplifying the optical signals regardless of whether the optical signals are distorted, supplying some of the amplified optical signals, and returning the other optical signals by using bidirectional characteristics thereof.

Advantageous Effects

The invention has the following effects. It is possible to check, by using the mutual gain saturation of a semiconductor optical amplifier of a central office, whether distortion occurs in two or more optical signals due to mutual interference when the optical signals pass through the SOA at the same time, to amplify the optical signals that are transmitted in the upward direction when no distortion occurs in the optical signals, and to monitor the occupation of a plurality of subscribers with respect to the common network when the plurality of subscribers want to use an optical Ethernet network. In this way, in each ONU, it is possible to dynamically check whether a collision between the optical signals passing through the common network occurs and whether the optical signals are successfully transmitted and thus to determine whether to retransmit the optical signals or whether to transmit the next information in a standby state.

Further, since the Ethernet-based CSMA/CD apparatus according to the present invention is an all-optical type, the existing electric media access control (MAC) device is not needed, which results in a high-speed operation. In addition, the Ethernet-based CSMA/CD apparatus according to the present invention can be used for a plurality of subscribers using an inexpensive light source. Further, since an optical receiver of the central office and all ONUs can simultaneously check whether a collision between optical signals occurs in the common network, optical lines can be dynamically connected. Furthermore, the invention can be applied to an intelligent optical Ethernet network capable of dynamically monitoring the state of the common network.

BRIEF DESCRIPTION OF THE DRAWINGS

FIG. 1 is a block diagram illustrating a general optical network

FIG. 2 is a block diagram illustrating an Ethernet-based all-optical carrier sense multiple access/collision detection apparatus according to an embodiment of the invention.

FIG. 3 is a diagram illustrating the characteristic relationship between a wavelength and the gain of a semiconductor optical amplifier according to the invention.

FIG. 4 is a diagram illustrating in detail an optical network unit (ONU) shown in FIG. 2.

FIG. 5 is a diagram illustrating the optical network unit accessing a common network in a time period from t1 to t5 according to the invention.

FIGS. 6A to 6C are diagrams illustrating the gain characteristics of the semi-conductor optical amplifier according to the invention.

FIG. 7 is a diagram illustrating two different packets that are transmitted from two ONUs 10-1 ($\lambda_{U1}$) and 10-1 ($\lambda_{U2}$) to verify experiments.

FIGS. 8A to 8C are diagrams illustrating the waveforms of optical signals returned to the ONUs 10-1 ($\lambda_{U1}$) and 10-1 ($\lambda_{U2}$) according to the transmission conditions.

BEST MODE FOR CARRYING OUT THE INVENTION

Hereinafter, preferred embodiments of the invention will be described in detail with reference to the accompanying drawings. Objects, a, may be understood more readily by those skilled in the art FIG. 2 is a block diagram illustrating an Ethernet-based all-optical CSMA/CD (carrier sense multiple access/collision detection) apparatus according to an embodiment of the invention. The Ethernet-based all-optical CSMA/CD apparatus according to the embodiment of the invention includes: a plurality of optical network units (ONUs) 10-1, 10-2, . . . , 10-n that transmit to a power splitter (PS) 30 upstream waves $\lambda_U$ that are in a gain bandwidth of a semiconductor optical amplifier (SOA) 53 and are carried with different optical signals; the PS 30 that multiplexes different optical signals supplied from the plurality of ONUs 10-1, 10-2, . . . , 10-n, transmits the multiplexed optical signals to a central office (CO) 50, and transmits an optical signal supplied from a WSC (wavelength selective coupler) 51 of the CO 50 to the ONUs 10-1, 10-2, . . . , 10-n; the CO 50 that checks whether the optical signals multiplexed by the PS 30 are distorted (collided) due to mutual interference by using a mutual gain saturation, amplifies the optical signals when no distortion occurs in the optical signals, and monitors the occupation of a plurality of subscribers with respect to a common network S1 when the plurality of subscribers want to use an optical Ethernet network.

The CO 50 selects the multiplexed optical signals supplied from the PS 30 according to the wavelength thereof, combines the optical signals, and transmits the combined optical signal to the SOA 53. The CO 50 includes the WSC 51, the SOA 53, and an optical receiver 55, and an optical transmitter 57.

The WSC 51 transmits to the PS 30 optical signals included in a downstream wave $\lambda_D$ supplied from the optical transmitter 57 in the downward direction.

The SOA 53 has functions of checking whether the optical signals that have been selected according to the wavelength thereof and then transmitted by the WSC 51 are distorted due to mutual interference by using the mutual gain saturation, amplifying the optical signals having no distortion therein, supplying some of the amplified optical signals to the optical receiver 55, and transmitting the other optical signals to the PS 30 through the WSC 51 by using bidirectional characteristics thereof. Also, when a collision between the optical signals occurs, the SOA 53 has functions of amplifying the optical signals, supplying some of the amplified optical signals to the optical receiver 55, and transmitting the other optical signals to the PS 30 through the WSC 51 by using the bidirectional characteristics thereof.

The optical receiver 55 receives some of the amplified optical signals from the SOA 53, and the optical transmitter 57 transmits to the WSC 51 the downstream waves $\lambda_D$ that are out of the gain bandwidth of the SOA 53 of the CO 50 and are carried with the optical signals.

As shown in FIG. 4, an ONU 10-$n$ of the plurality of ONUs 10-1, 10-2, ..., 10-$n$ includes: a WSC 10-$n$1 that extracts only the optical signals to be transmitted to a corresponding subscriber among the optical signals supplied from the PS 30 and provides the extracted optical signal; an optical downstream wave detector 10-$n$2 that detects the optical signals carried on the downstream wave $\lambda_D$ among the optical signals to be transmitted to the corresponding subscriber that are extracted by the WSC 10-$n$1; an optical coupler 10-$n$3 that divides the other optical signals carried on the downstream wave $\lambda_D$ that are returned by the bidirectional characteristics thereof, among the optical signals to be transmitted to the corresponding subscriber that are extracted by the WSC 10-$n$1; and an optical upstream wave detector 10-$n$4 that detects the other optical signals divided by the optical coupler 10-$n$3. Also, the plurality of ONUs 10-1, 10-2, ..., 10-$n$ each include the WSC, the optical downstream wave detector, the optical coupler, and the optical upstream wave detector.

MODE FOR THE INVENTION

An Ethernet-based all-optical carrier sense multiple access method according to the invention will be described in detail below on the basis of the above-mentioned configuration.

First, since the SOA 53 of the CO 50 that operates in a wavelength of 1550 nm is used in order to verify propriety, the wavelength of the upstream wave $\lambda_U$ is set to 1550 nm, and the wavelength of the downstream wave $\lambda_D$ is set to 1300 nm. If it is assumed that the SOA 53 operates in a wavelength of 1300 nm, it is possible to accept wavelengths (a downstream wavelength: 1550 nm; and an upstream wavelength: 1310 nm) recommended by ITU-T (International Telecommunication Union-Telecommunication Standardization Sector).

A Fabry-Perot laser or a distributed feedback laser may be used as a light source for the upstream wave $\lambda_U$. In addition, it is assumed that the maximum distance between the SOA 53 and the plurality of ONUs 10-1, 10-2, ..., 10-$n$ is set to 4 kilometers.

For the convenience of explanation, under the above-mentioned conditions, two ONUs 10-1 and 10-2 among the plurality of ONUs 10-1, 10-2, ..., 10-$n$ will be described below. That is, as shown in FIG. 3, the ONUs 10-1 and 10-2 carry different optical signals on upstream waves $\lambda_{U1}$ and $\lambda_{U2}$ that are within the gain bandwidth of the SOA and transmits the upstream waves to the PS 30.

The PS 30 multiplexes different optical signals supplied from the ONUs 10-1 and 10-2 and transmits the multiplexed optical signals to the WSC 51 of the CO 50.

The WSC 51 selects the multiplexed optical signals supplied from the PS 30 according to the wavelengths thereof, combines the selected optical signals, and transmits the combined optical signal to the SOA 53. Then, SOA 53 checks whether the optical signals that has been selected according to the wavelengths thereof and then supplied by the WSC 51 are distorted due to the mutual interference by using the mutual gain saturation.

As the check result, as shown in FIG. 5, only the ONU 10-1 ($\lambda_{U1}$) or 10-2 ($\lambda_{U2}$), which is a subscriber, accesses the SOA 53 through the common network S1 in a time period from t3 to t4 or after a time t5. Therefore, as shown in FIGS. 6B and 6C, the SOA 53 is not subjected to the mutual gain saturation, and amplifies only the magnitudes of the optical signals by pre-amplification. Then, the SOA 53 supplies some of the amplified optical signals to the optical receiver 55 and transmits the other optical signals to the PS 30 through the WSC 51 by using the bidirectional characteristics thereof.

On the other hand, as the check result, as shown in FIG. 5, when the two ONUs 10-1 ($\lambda_{U1}$) and 10-2 ($\lambda_{U2}$), which are subscribers, access the common network S1 at the same time in a time period from t1 to t2, crosstalk and interference occurs between the optical signals passing through the SOA 53 due to the mutual gain saturation, as shown in FIG. 6A, which causes the original optical signals to be distorted. In this case, the SOA 53 amplifies the optical signals, supplies some of the amplified optical signals to the optical receiver 55, and transmits the other amplified optical signals to the PS 30 through the WSC 51 by using the bidirectional characteristics thereof.

The PS 30 transmits to the two ONUs 10-1 ($\lambda_{U1}$) and 10-2 ($\lambda_{U2}$), which are subscribers, the optical signals carried on the upstream waves $\lambda_{U1}$ and $\lambda_{U2}$ that are returned through the WSC 51.

As shown in FIG. 4, the two ONUs 10-1 ($\lambda_{U1}$) and 10-2 ($\lambda_{U2}$), which are subscribers, include WSCs 10-11 and 10-21, optical downstream wave detectors 10-12 and 10-22, optical couplers 10-13 and 10-23, and optical upstream wave detectors 10-14 and 10-24, respectively. The WSC 10-11 or 10-21 extracts the optical signals to be transmitted to a corresponding subscriber among the optical signals supplied from the PS 30 and supplies the extracted optical signals to the optical coupler 10-13 or 10-23. The optical coupler 10-13 or 10-23 divides the other optical signals carried on the upstream waves $\lambda_U$ that are returned by the bidirectional characteristics thereof, among the optical signals to be transmitted to the corresponding subscriber that has been extracted by the WSC 10-11 or 10-21. Then, the optical upstream wave detector 10-14 or 10-24 detects the other optical signals divided by the optical coupler 10-13 or 10-23.

An oscilloscope S2 is operatively associated with the optical upstream wave detectors 10-14 and 10-24, which makes it possible to monitor the state of the detected optical signal in real time, as shown in FIGS. 7 and 8.

FIG. 7 is a diagram illustrating two different packets transmitted from the two ONUs 10-1 ($\lambda_{U1}$) and 10-2 ($\lambda_{U2}$), which are subscribers, in order to verify experiments. Referring to FIG. 7, the packet is a frame pattern composed of a source address (SD) for creating Ethernet optical packet information, destination address (DA) information of an optical signal, data to be actually transmitted, and a frame check sequence (FCS). In the case of the ONU 10-1 ($\lambda_{U1}$), SD is '1010'. In the case of the ONU 10-2 ($\lambda_{U2}$), SD is '1011'.

FIGS. 8A to 8C are diagrams illustrating the waveforms of optical signals returned to the ONUs 10-1 ($\lambda_{U1}$) and 10-2 ($\lambda_{U2}$) according to transmission conditions. More specifically, FIG. 8A shows a case in which only the ONU 10-1 ($\lambda_{U1}$) transmits packets (when no collision occurs). In FIG. 8A, an upper waveform is the waveform of a packet from the ONU 10-1 ($\lambda_{U1}$), and a lower waveform is the waveform of a packet that is detected and restored by the ONU 10-2 ($\lambda_{U2}$).

FIG. 8A shows that a channel signal having the source address '1010' is transmitted without any distortion.

FIG. 8B shows a case in which only the ONU 10-2 ($\lambda_{U2}$) transmits packets (when no collision occurs). In FIG. 8B, an upper waveform is the waveform of a packet from the ONU 10-1 ($\lambda_{U1}$), and a lower waveform is the waveform of a packet that is detected and restored by the ONU 10-2 ($\lambda_{U2}$). FIG. 8B shows that a channel signal having the source address '1011' is transmitted without any distortion.

FIG. 8C shows a case in which the two ONUs 10-1 ($\lambda_{U1}$) and 10-2 ($\lambda_{U2}$) transmit packets at the same time (when a collision occurs). In FIG. 8C, an upper waveform is the waveform of a packet from the ONU 10-1 ($\lambda_{U1}$), and a lower waveform is the waveform of a packet that is detected and restored by the ONU 10-2 ($\lambda_{U2}$). FIG. 8C shows that signals are distorted due to the mutual gain saturation and thus information on the source address '1010' or '1011' is not detected any more.

Meanwhile, the optical transmitter 57 of the CO 50 carries optical signals on the downstream wave $\lambda_D$ that is out of the gain bandwidth of the SOA shown in FIG. 3 and transmits the downstream wave to the WSC 51. Then, the WSC 51 transmits to the PS 30 the optical signals carried on the downstream wave $\lambda_D$ supplied from the optical transmitter 57. The PS 30 transmits to the ONUs 10-1, 10-2, ..., 10-$n$ the optical signals carried on the downstream wave $\lambda_D$ supplied from the WSC 51.

For the convenience of explanation, an ONU 10-$n$ among the plurality of ONUs 10-1, 10-2, ..., 10-$n$ will be described below. When a WSC 10-$n$1 of the ONU 10-$n$ extracts the optical signals to be transmitted to a corresponding subscriber among the optical signals supplied from the PS 30, an optical downstream wave detector 10-$n$2 detects the optical signals carried on the downstream wave $\lambda_D$ among the optical signals to be transmitted to the corresponding subscriber that have been extracted by the WSC 10-$n$1.

It is possible to check, by using the mutual gain saturation of the SOA 53 of the CO 50, whether distortion occurs in two or more optical signals due to mutual interference when the optical signals pass through the SOA 53 at the same time, to amplify the optical signals that are transmitted in the upward direction when no distortion occurs in the optical signals, and to monitor the occupation of a plurality of subscribers with respect to the common network when the plurality of subscribers want to use an optical Ethernet network. In this way, it is possible to dynamically check in each of the ONUs 10-1, 10-2, ..., 10-$n$ whether a collision between the optical signals passing through the common network S1 occurs and whether the optical signals are successfully transmitted and thus to determine whether to retransmit the optical signals or whether to transmit the next information in a standby state.

Further, since the Ethernet-based CSMA/CD apparatus according to the present invention is an all-optical type, the existing electric media access control (MAC) device is not needed, which results in a high-speed operation. In addition, the Ethernet-based CSMA/CD apparatus according to the present invention can be used for a plurality of subscribers using an inexpensive light source. Further, since the optical receiver 55 of the CO 50 and all the ONUs 10-1, 10-2, ..., 10-$n$ can simultaneously check whether a collision between optical signals occurs in the common network S1, optical lines can be dynamically connected. Furthermore, the invention can be applied to an intelligent optical Ethernet network capable of dynamically monitoring the state of the common network.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within meets and bounds of the claims, or equivalents of such meets and bounds are therefore intended to be embraced by the claims.

INDUSTRIAL APPLICABILITY

The present invention relates to an Ethernet-based CSMA/CD apparatus and method According to the invention, it is possible to dynamically check whether a collision between the optical signals passing through the common network occurs and whether the optical signals are successfully transmitted. Further, since the invention uses an all-optical type, the existing electric media access control (MAC) device is not needed, which results in a high-speed operation. In addition, the invention can be used for a plurality of subscribers using an inexpensive light source. Thus, the invention can be effectively used for an optical communication industry.

The invention claimed is:

1. An Ethernet-based all-optical carrier sense multiple access/collision detection (CSMA/CD) apparatus comprising:
    a plurality of optical network units (ONUs) that carry different optical signals on upstream waves λU and transmit the upstream waves λU;
    a power splitter (PS) that multiplexes the optical signals and transmits the multiplexed optical signals; and
    a central office (CO) that checks whether the multiplexed optical signals are distorted, amplifies some of the checked optical signals, returns the other optical signals, and monitors the occupation of the plurality of optical network units with respect to a common network,
    wherein the central office includes a semiconductor optical amplifier (SOA) that checks whether the optical signals are distorted due to mutual interference by using a mutual gain saturation, amplifies the optical signals regardless of whether the optical signals are distorted, supplies some of the amplified optical signals, and returns the other optical signals to the plurality of optical network units by using bidirectional characteristics thereof.

2. The Ethernet-based CSMA/CD apparatus according to claim 1,
    wherein the central office further includes:
    a wavelength selective coupler (WSC) that selectively combines the multiplexed optical signals according to the wavelengths thereof and supplies the combined signals;
    an optical receiver that receives some of the amplified optical signals; and
    an optical transmitter that carries the optical signals on a downstream wave λD and transmits the downstream wave λD to the plurality of optical network units.

3. The Ethernet-based CSMA/CD apparatus according to claim 2,
    wherein the downstream wave λD is located beyond a gain bandwidth of the semiconductor optical amplifier.

4. The Ethernet-based CSMA/CD apparatus according to claim 1,
    wherein the upstream wave λU is located within the gain bandwidth of the semiconductor optical amplifier.

5. The Ethernet-based CSMA/CD apparatus according to claim 4,
wherein a Fabry-Perot laser or a distributed feedback laser is used as a light source for the upstream wave λU.

6. The Ethernet-based CSMA/CD apparatus according to claim 1,
wherein each of the plurality of optical network units includes:
a wavelength selective coupler that extracts only the optical signals to be transmitted to a corresponding subscriber among the optical signals supplied from the power splitter;
an optical downstream wave detector that detects the optical signals carried on the downstream wave λU among the extracted optical signals;
an optical coupler that divides the other optical signals carried on the upstream wave λD that is returned by the bidirectional characteristics among the extracted optical signals; and
an optical upstream wave detector that detects the other optical signals divided by the optical coupler.

7. An Ethernet-based all-optical carrier sense multiple access/collision detection (CSMA/CD) method comprising:
a first step of carrying different optical signals on an upstream wave λU and transmitting the upstream wave λU;
a second step of multiplexing the optical signals, selecting the multiplexed optical signals according to wavelengths thereof, combining the selected optical signals, and transmitting the combined optical signals; and
a third step of, by a semiconductor optical amplifier (SOA), checking whether the combined optical signals are distorted due to mutual interference by using a mutual gain saturation, amplifying the optical signals regardless of whether the optical signals are distorted, supplying some of the amplified optical signals to an optical receiver, and returning the other optical signals by using bidirectional characteristics thereof.

8. The Ethernet-based CSMA/CD method according to claim 7,
wherein the upstream wave λU is located within a gain bandwidth of a semiconductor optical amplifier.

9. The Ethernet-based CSMA/CD method according to claim 8,
wherein a Fabry-Perot laser or a distributed feedback laser is used as a light source for the upstream wave λU.

10. The Ethernet-based CSMA/CD method according to claim 7,
wherein, in the third step, the optical signals returned by the bidirectional characteristics are detected by an optical upstream wave detector.

* * * * *